United States Patent [19]

Daly et al.

[11] Patent Number: 5,859,920
[45] Date of Patent: Jan. 12, 1999

[54] METHOD FOR EMBEDDING DIGITAL INFORMATION IN AN IMAGE

[75] Inventors: Scott J. Daly, Scottsville; John R. Squilla; Michel Denber, both of Rochester; Chris W. Honsinger, Webster; John Hamilton, Rochester, all of N.Y.

[73] Assignee: Eastman Kodak Company, Rochester, N.Y.

[21] Appl. No.: 565,804

[22] Filed: Nov. 30, 1995

[51] Int. Cl.$^6$ .............................. G06K 9/00; G06K 9/36; G06K 9/64

[52] U.S. Cl. .......................... 382/115; 382/203; 382/279; 382/284; 358/456

[58] Field of Search .................................... 382/203, 279, 382/284, 115; 358/455, 456, 457, 458; 380/3, 23

[56] References Cited

U.S. PATENT DOCUMENTS

| | | | |
|---|---|---|---|
| 3,586,434 | 6/1971 | Mueller | 355/2 |
| 4,491,964 | 1/1985 | Sanner | 382/266 |
| 4,939,515 | 7/1990 | Adelson | 341/51 |
| 4,972,471 | 11/1990 | Gross et al. | 380/3 |
| 5,091,966 | 2/1992 | Bloomberg et al. | 382/21 |
| 5,126,779 | 6/1992 | Maitani | 396/238 |
| 5,128,525 | 7/1992 | Stearns et al. | 235/454 |
| 5,168,147 | 12/1992 | Bloomberg | 235/456 |
| 5,204,790 | 4/1993 | Yang | 360/68 |
| 5,221,833 | 6/1993 | Hecht | 235/494 |
| 5,245,165 | 9/1993 | Zhang | 235/454 |
| 5,285,438 | 2/1994 | Marchand et al. | 369/103 |
| 5,379,345 | 1/1995 | Greenberg | 380/23 |
| 5,436,970 | 7/1995 | Ray et al. | 380/23 |
| 5,600,402 | 2/1997 | Kainen | 355/22 |
| 5,613,004 | 3/1997 | Copperman et al. | 380/28 |
| 5,636,292 | 6/1997 | Rhoads | 382/115 |
| 5,687,236 | 11/1997 | Moskowitz et al. | 380/28 |

FOREIGN PATENT DOCUMENTS

| | | |
|---|---|---|
| 0 493 053 A2 | 7/1992 | European Pat. Off. . |
| 0 581 317 A2 | 2/1994 | European Pat. Off. . |

OTHER PUBLICATIONS

J. Zhao & E. Koch, "Embedding Robust Labels Into Images for copyright Protection", pp. 242–251.
E.Sapwater & K. Wood, "Electronic Copyright Protection", *PHOTO>Electronic Imaging*, vol. 37, No. 6, 1994, pp. 16–21.
Bender et al., "Techniques for Data Hiding", *Proceedings of the SPIE*, 2420:40 Feb. 1995, pp. 1–10.
S. Walton, "Image Authentication for a Slippery New Age", *Dr. Dobb's Journal*, Apr. 1995, pp. 18–26.
vanSchyndell et al., "A Digital Watermark", *IEEE*, 1994. pp. 86–90.
"A Signal Theoretic Method for Creating Forgery–Proof Documents For Automatic Verification", Wolfram Szepanski, 1979, Carnahan Conference On Crime Countermeasures.

*Primary Examiner*—Leo H. Boudreau
*Assistant Examiner*—Daniel G. Mariam
*Attorney, Agent, or Firm*—Thomas H. Close

[57] ABSTRACT

A method of embedding digital data in a source image includes the steps of: a) generating a multi-level data image representing the digital data; b) convolving the multi-level data image with an encoding carrier image to produce a frequency dispersed data image; and c) adding the frequency dispersed data image to the source image to produce a source image containing embedded data. The data is recovered from the image by: a) cross correlating the source image containing embedded data with a decoding carrier image to recover the data image; and b) extracting the digital data from the recovered data image.

11 Claims, 11 Drawing Sheets

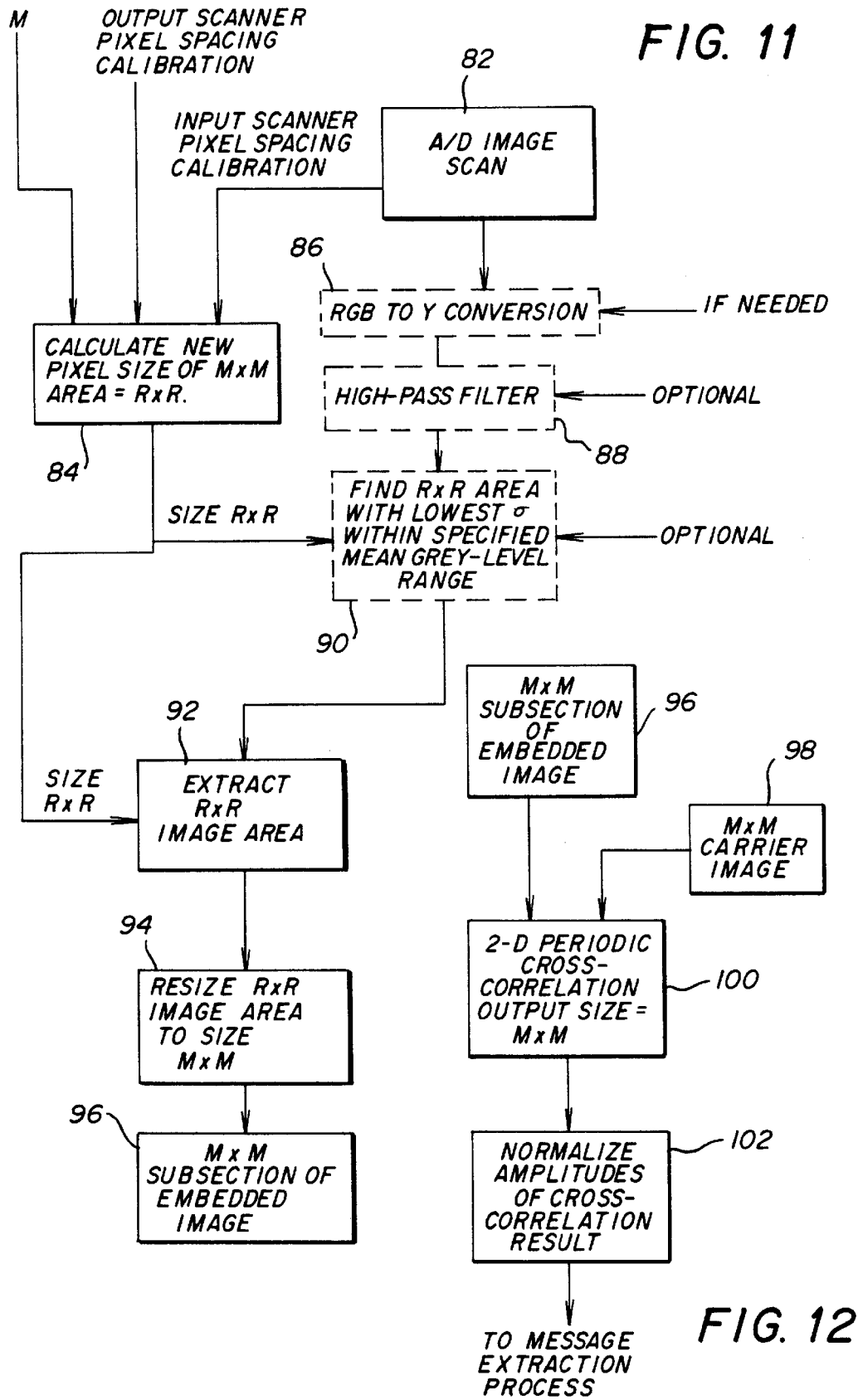

METHOD FOR EMBEDDING DIGITAL INFORMATION IN AN IMAGE

FIELD OF THE INVENTION

The invention relates generally to the field of image processing, and in particular to a method of embedding digital information in an image.

BACKGROUND OF THE INVENTION

It is known that photographs or images can have information contained within the image area (for example: bar codes, date and time). It is also known that digital information (computer readable) can be applied to the image area. There are have been several endeavors to embed digital data in images, for example for copyright protection. For various reasons as noted below, none of these methods are appropriate for embedding data in images containing general photographic content with minimal visibility while retaining the existing quality of the image. It is also a desirable feature to be able to encode the data in the image either optically or digitally. The techniques that do address embedding data in images are limited to special subsets of images including uniform fields of color, graphically generated images with large areas of uniform color (such as the pie-charts of business graphics), or text. Known prior art methods of embedding digital information in images have several drawbacks for application to images having photographic pictorial content. With these technologies, the image may be partially or completely distorted, the embedded data can be digitally removed, or the method may require a significant modification to hardware in order to implement the technology. Some of these technologies use areas outside of the image area (glyphs or bar codes) because the techniques are largely destructive of the image itself and require a uniform background to read the information. Some methods create visible distortions within the image that can be unsightly and/or undesirable. Other techniques such as applying logos, labels, or stickers to an image can be easily hidden (covered) and can also be unsightly. Magnetic strips applied to the image require the scanning devices to be specially modified with a magnetic detector to allow the strip to be sensed. Most of these methods provide a binary solution (that is, they allow only a yes/no or go/no-go solution).

U.S. Pat. No. 4,939,515 issued July 1990 to Adelson shows a technique for embedding digital information in television signals. The technique first decomposes the image into a resolution pyramid, the layer of the pyramid having the highest spatial frequencies is omitted and a Hadamard-based bit stream is substituted. This approach relies on the fact that the optical spot of a CRT contributes far more strongly to the high frequency attenuation of the CRT MTF than any of the transmission components. Therefore, the signal can be encoded, transmitted, and decoded by the electronics, while the optics of the CRT attenuates the high frequencies such that the embedded digital stream is not visibly objectionable. It also relies on the property of human visual psychophysics where the high spatial frequency sensitivity of the visual system is limited to low temporal frequencies, and thus by having the high frequency digital stream change from TV field to TV field, the human eye is not very sensitive to it. This method can achieve data embedding that is entirely invisible under some circumstances (i.e., on TV monitors with poor MTF characteristics, far viewing distances, or certain image sequences). This approach also requires the encoding step to be performed digitally. Another shortcoming is that the technique relies on systems with low physical MTF relative to the nyquist frequency, which is generally not true across the widely varying image qualities of current imaging systems. Yet another shortcoming is that it relies on the high frequency digital signal information having a high temporal frequency. This is impossible to achieve in still images in hard-copy form.

U.S. Pat. No. 4,972,471 issued November 1990 to Gross uses notch filters and temporal modulation of their output in order to embed digital information inaudibly in recordings. One of the stated applications is toward the monitoring of broadcast recordings for copyrights. The recorded signal is embedded in a two pass algorithm. First the recording is scanned and decomposed into several notch frequencies (frequencies corresponding to the musical diatonic scale are suggested) to look for the best placement of a start code. This is decided by use of the properties of audio masking known from the science of acoustic psychophysics, and the method looks for the presence of two neighboring frequencies, one having a sufficiently higher amplitude than the other. Audio masking dictates that the lower amplitude frequency can be removed without the human observer being able to hear the difference. Once this temporal location is decided in the first pass, the second pass of the algorithm determines the temporal starting point of the code and the notch frequencies used and calibrates this against the existing parallel SMPTE code. This data is stored by those wishing to test identity of the signal (i.e., the owners), and is not made available to those wishing to corrupt the embedded data (i.e., the copyright infringer). The second pass actually embeds the start code pattern and the identifying information in a specified temporal gap after the appearance of the start code. The bits of the identifying information are encoded as temporal modulation of the notch filter content. Although the patent suggests that the method may be applied to images, the drawbacks in trying to apply this approach to images include:

1. there is no equivalent of the SMPTE time code in images and therefore finding an equivalent of the start code would be very difficult;

2. the placement of the embedded information depends on the content of the recorded signal in order to determine where (both in frequency and in time) to place the embedded information, which requires a digital or complex analog system; and 3. the data is not spatially spread throughout the image. Consequently, if the start code or the identifying code is accidentally blocked by unintentional or intentional corruptions of the signal, which in the optical imaging application would include such defects as dust and scratches, the data will be lost.

U.S. Pat. Nos. 5,091,966 issued February 1992 to Bloomberg; 5,128,525 issued July 1992 to Stearns, et al.; 5,168,147 issued December 1992 to Bloomberg; 5,221,833 issued June 1993 to Hecht; and 5,245,165 issued September 1993 to Zhang, comprise a family of patents that address embedding digital information invisibly within in hard-copy images. However, they are limited to images containing significant uniform areas of color, such as found in computer-generated graphics for business and science data presentation, or images containing text. The approach they have taken is to use small localized and non-overlapping gray-scale shapes to carry the bit information. The shapes are referred to as glyphs, and are small enough and closely packed so that they visually merge into a uniform field when printed on a sufficiently high resolution device (300 dpi).

This technique works in electrophotographic copying machines because such machines have the ability to capture very high resolution edges (the amplitude dimension is often captured with low resolution, however) in order to keep the edges of the text sharp in appearance. The various patents address different shapes, different methods of dealing with scale changes, and different methods of dealing with image skew, such as rotation. The technique is basically a matched filter method used to directly search the embedded image for the glyphs. The technique does not work with images consisting of photographic subject matter including such image features as texture and grain noise because the texture and grain noise would mask the detection of the glyphs.

Several articles also describe various methods of embedding data for copyright protection. Schyndell, "A digital Watermark" IEEE ICIP-94 (1994) presents a method based on modulation of the least significant bit (LSB) of a digital image. This method requires digital encoding and the message would be lost if that bit is truncated, or if the noise levels in an image are increased, which is likely in the scanning of the digital image out to hard copy form, as well as scanning the image in from hard copy. Sapwater et al., "Electronic Copyright Protection", Photo Electronics Imaging, Vol 7, No. 6, pages 16–21 (1994) explores the issues in copyright protection of digital images, but does not present a satisfactory solution. The proposed solution is to digitally place a copyright symbol in the Yellow layer of a Cyan, Magenta, Yellow, and Black (CMYK) version of a color image. When the image is shown in color, the symbol is hard to see because of the weak blue-yellow sensitivity of the human eye. However, when the color image is broken down into C, M, Y, K layers, and the Y layer is displayed as a black and white image, it is possible for the human observer to see the copyright symbol. This technique has the disadvantages that it requires the encoding to be performed digitally, and further requires human intervention to place the symbol in an area where it is not likely to degrade the image (such as avoiding the subject's face). It also has the disadvantage that the detection of the copyright is not automated. Bender et al, "Techniques for Data Hiding", SPIE Proceedings 2420 (1995) present two techniques for embedding small amounts of digital data in images. One of these is termed Texture Block Coding and involves digitally copying a specifically shaped region of texture from one portion of the image to another. The bit pattern is encoded in the shape. Two disadvantages of this technique are that the encoding must be done digitally, and further it requires a skilled image operator to select similarly textured regions to perform the swap. Further, the Bender paper does not explicitly state how to code digital information in the shapes, and has not performed such studies. Another method proposed by Bender is called Patchwork and involves slight offsets of pixels (which may also be low-pass filtered blob-like regions consisting of large numbers of actual pixels) in positive and negative directions so that as a specific path is taken through the image, the expected value of the differences deviates strongly from the mean of the image. This approach is intended to code only one bit of information, but it may be extended to a small number of bits (<8) by methods not explicitly defined in the paper. No way of implementing the technique optically or with hard copy was disclosed. A problem with applying the Patchwork technique to hardcopy is that of finding the proper pathway through an image after it has been converted to a digital image by scanning due to size and rotation issues. Walton, "Image Authentication for a Slippery New Age", Dr. Dobbs Journal, April, page 18–26 (1995) presents a technique for data embedding for image authentication using a checksum method. The technique is easily corrupted and would not likely survive a hardcopy form. The Walton technique has the further disadvantage that it requires the encoding to be performed digitally.

There is a need therefore for a technique for embedding digital data in images that can be implemented either digitally or optically, that will not visibly distort the image, is not easily corrupted by image content or defects, and is not lost when the image is cropped, rotated, or resized.

SUMMARY OF THE INVENTION

The present invention is directed to overcoming one or more of the problems set forth above. Briefly summarized, according to one aspect of the present invention, a method of embedding digital data in a source image includes the steps of: a) generating a multi-level data image representing the digital data; b) convolving the multi-level data image with an encoding carrier image to produce a frequency dispersed data image; and c) adding the frequency dispersed data image to the source image to produce a source image containing embedded data. The data is recovered from the image by: a) cross correlating the source image containing embedded data with a decoding carrier image to recover the data image; and b) extracting the digital data from the recovered data image.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 11 is a flow chart illustrating the steps of scanning an image having embedded data;

FIG. 12 is a flow chart illustrating the steps of recovering the data image from a source image with embedded data;

To facilitate understanding, identical reference numerals have been used, where possible, to designate identical elements that are common to the figures.

DETAILED DESCRIPTION OF THE INVENTION

Figure 1:
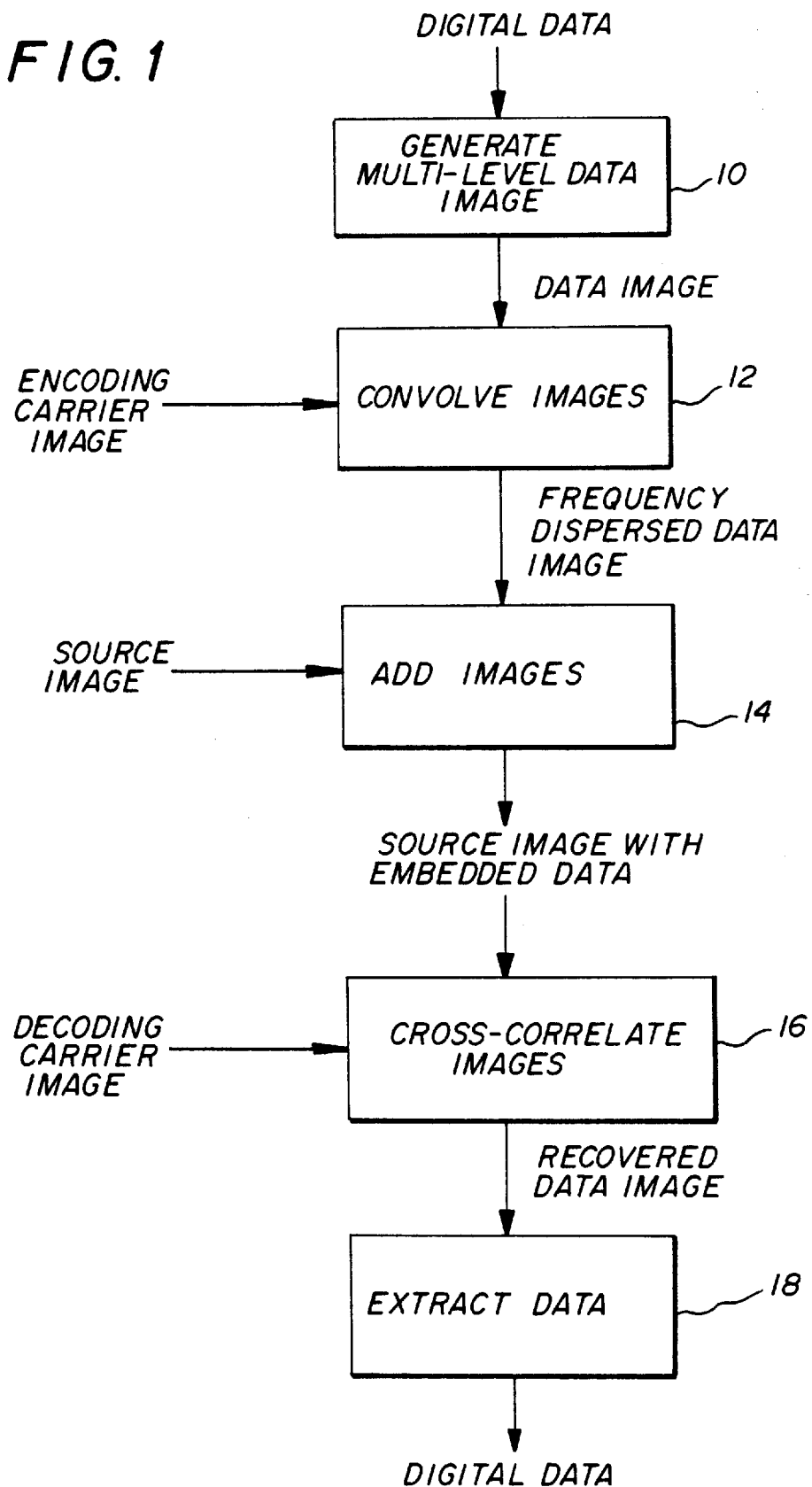
FIG. 1 is a flow chart illustrating generally the method of the present invention.

Referring to FIG. 1, the method of embedding digital data in an image according to the present invention will be described. The invention can be best considered in its two stages: an encoding process and a decoding process. First, a multi-level data image is generated 10 from digital data. The digital data may represent an identifier for the image such as a catalogue number, a copyright notice, information about the owner of the copyright such as her name and address, a pointer to additional information, a web site address on the Internet, etc. The multi-level data image as described in detail below is an image having a constant background value and an array of spots on the background representing the digital data. The data image may be produced using digital image processing techniques, or may be produced optically for example by exposing spots on a photographic film.

Next, the data image is convolved 12 with an encoding carrier image to form a frequency dispersed data image. The encoding carrier image is preferably a rotationally symmetric, low amplitude, high frequency pattern employed to spatially disperse the data image to mask its visibility when added to the source image. Preferably the convolution is performed on a digital computer using a well known Fourier Transform method and digital versions of the data image and the encoding carrier image. The convolution may also be performed using a direct convolution algorithm on the digital computer. Alternatively, the convolution may be performed optically using well known optical convolution techniques and optical versions of the data image and the encoding carrier image.

The frequency dispersed data image is then added 14 to the source image to form a source image with embedded data. As described in more detail below, the addition may be performed either optically using traditional photographic processes, or digitally using a digital computer and digital versions of the source image and the frequency dispersed data image. If the addition is performed digitally, a hard copy version of the digital source image having embedded data may be produced using a digital printer such as a thermal, ink-jet, electrophotographic, or silver halide printer.

The digital data is recovered from the source image having embedded data by first cross correlating 16 the source image having embedded data with a decoding carrier image to produce a recovered data image. Preferably, the decoding carrier image is identical to the encoding carrier image and the cross correlation is performed by a digital computer on digital versions of the source image having embedded data and the decoding carrier image. If a hard copy of the source image having embedded data is used, the hard copy is first scanned as described in detail below to produce a digital version. Alternatively, the cross correlation may be performed using well known optical techniques and optical versions of the source image having embedded data and the decoding carrier image.

Finally, the digital data is extracted 18 from the recovered data image. Preferably, the digital data is extracted from a digital version of the recovered data image using a pattern recognition process in a digital computer.

Figure 2:
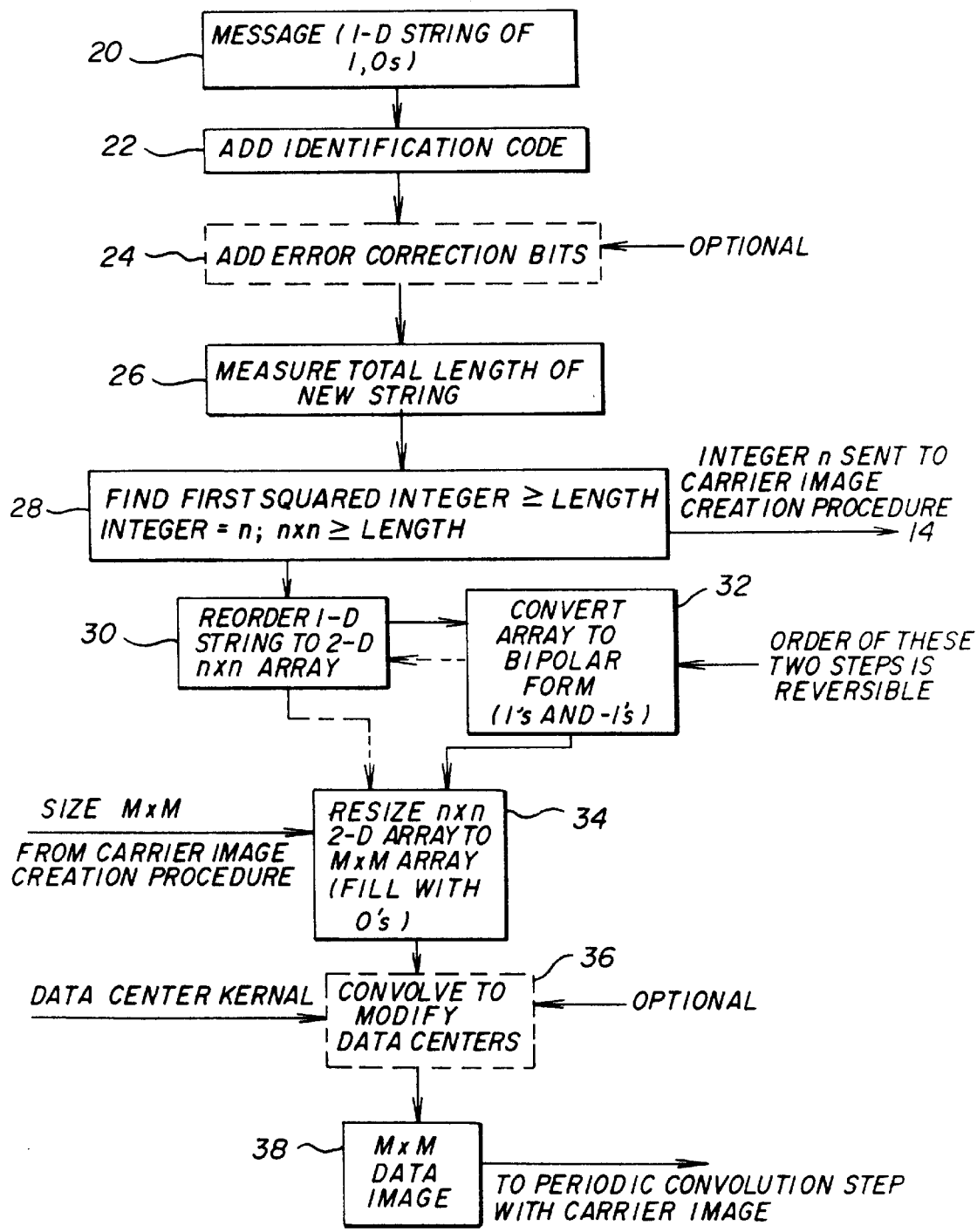
FIG. 2 is a flow chart showing the steps for converting digital data to a data image.

The details of step 10 for converting digital data to a Data image are shown in FIG. 2. The process begins with a message 20 in a 1-D digital representation and first adds a unique identification code such as a start code 22, comprising a particular series of 1's and 0's that will not occur in the actual digital message. The identification code need not be placed at the start of the data, it may be placed any where in the data, and may be dispersed within the data. An optional next step is to add any well known error correction coding 24 to the string. The particular error correction code chosen depends upon the application and factors such as bit error rate and the amount of correlation in the errors. The new total number of bits are measured 26 and a geometric pattern sufficiently large to contain the total number of bits is chosen. The pattern can be any geometric shape, including a linear string or a rectangular array. In the following example, a square array will be described. To determine the dimensions of the square array, the lowest integer whose squared value is greater than or equal to the total number of bits is calculated in step 28. We will refer to this integer as n, and this value will be sent to the module for generating the Carrier Image. The 1-D array is reordered 30 to an n×n 2-D array using an predetermined ordering method such as a raster pattern.

The order of the following two steps is reversible. The data string is arranged into the n×n square array (if the data string does not fill the square array, remaining positions in the array are padded, for example with zeros), with the preferred method of filling the array being lexicographical, although any other ordering method will work as long as the decoder knows the ordering scheme as well. In step 32 the 0's of the array are converted to values of −1. This bipolar data representation scheme has advantages in the decoding step. After both of these steps 30 and 32, the next step 34 is to resize the n×n array into an array of size M×M. The value M of this new array is the size of the encoding carrier image as described below. This resizing 34 is accomplished by uniformly filling in the additional pixels with values of the background level, so that an n×n array of pixels is embedded within an image of size M×M. The pixels of the embedded array contain multilevel data values such as 1 or −1. These pixel locations will be referred to as data centers. Optionally, this M×M image where the data centers are represented by single pixels may be convolved 36 with a data center shaping kernel such as a Gaussian or a pill box function to enlarge the data centers in the M×M array. This optional step may be used to facilitate the decoding procedure, which can then use a matched filter to aid in finding the data centers. The final result of this process is a data image 38 which has a digital size of M×M pixels in the preferred embodiment.

Figure 3:
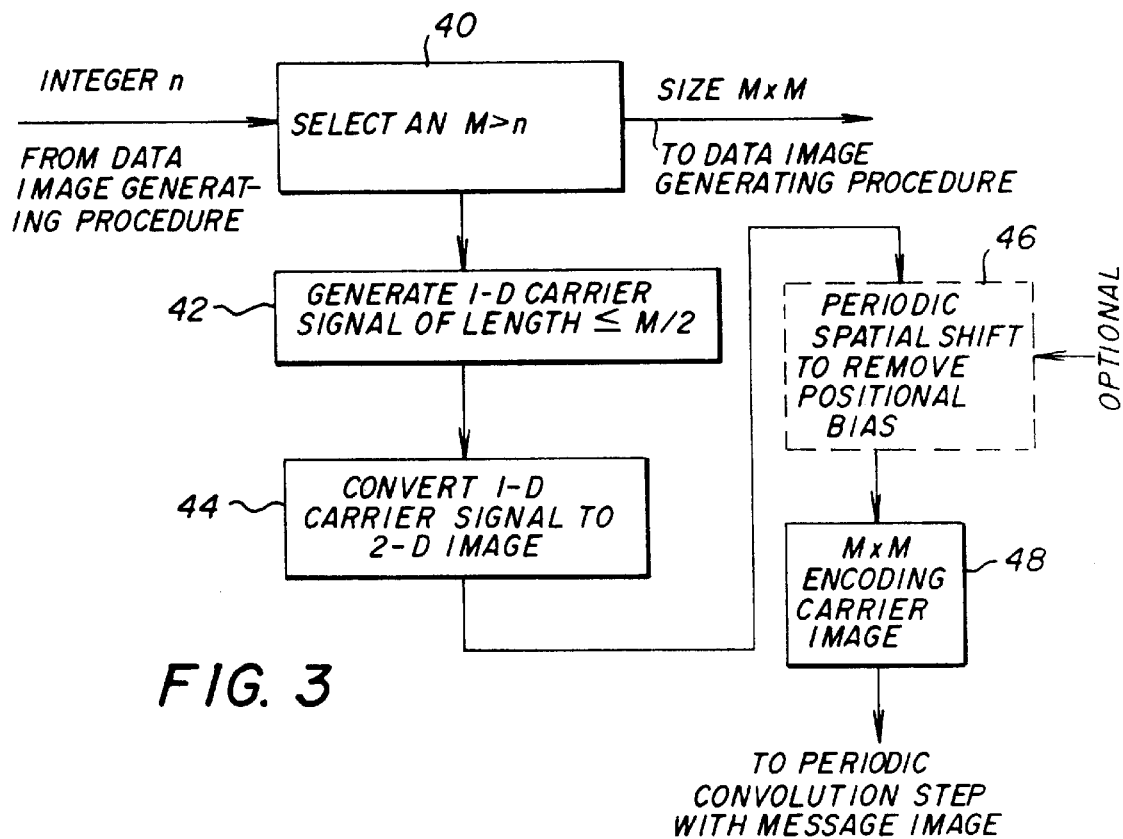
FIG. 3 is a flow chart showing the steps for generating an encoding carrier image.
Figure 4:
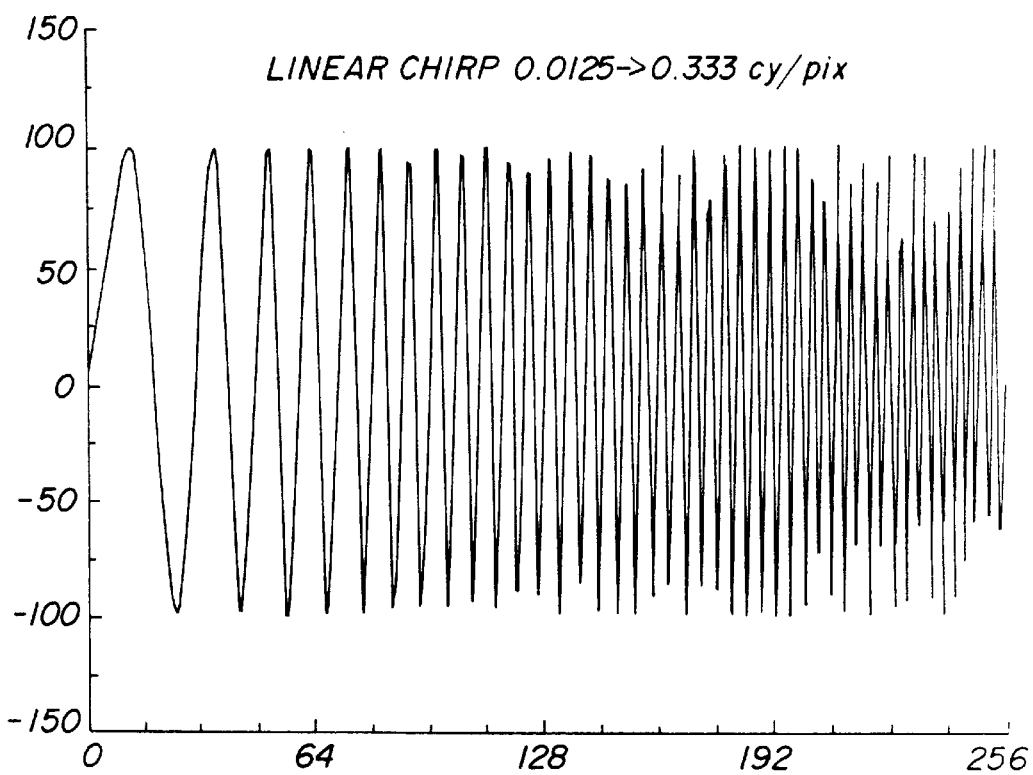
FIG. 4 is a graph showing a 1-D linear chirp carrier signal.
Figure 5:
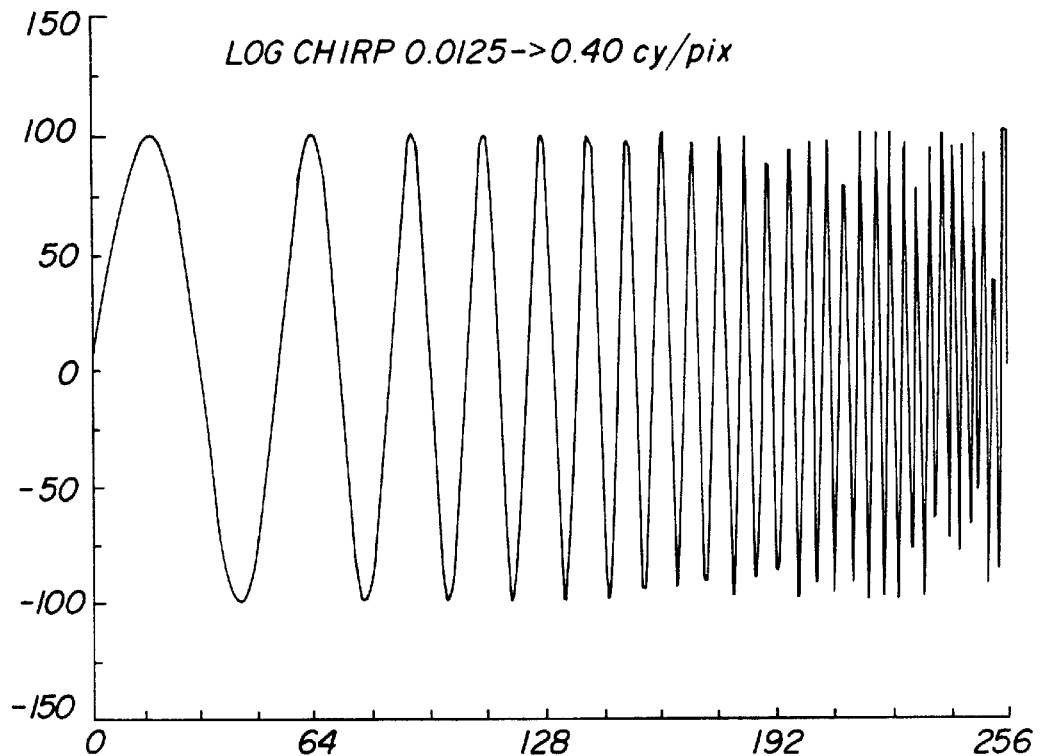
FIG. 5 is a graph showing a 1-D log chirp carrier signal.
Figure 6:
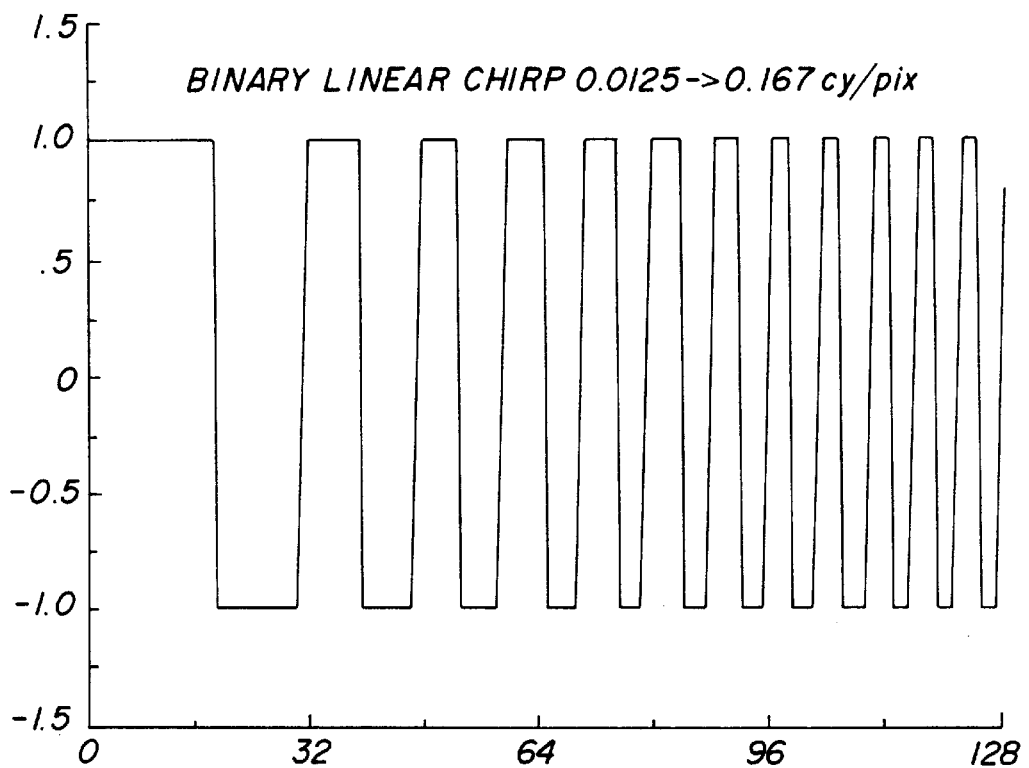
FIG. 6 is a graph showing a 1-D binary linear chirp carrier signal.

Referring to FIG. 3, the generation of the carrier image will be described in detail. The size M×M of the Carrier Image is selected 40, where M is greater than n. The size M may be determined from other application design constraints such as the size of the source image or the possibility that the source image will be cropped. Next, a 1-D carrier signal of length M/2 and having a zero mean value is generated 42. One way of generating the carrier signal is to create a sine wave whose frequency is varied from a specified low frequency to a specified high frequency. Such a sine wave of increasing frequency is referred to as a chirp signal. The frequency can vary linearly with position or logarithmically, and these signals will be referred to as linear chirps and log chirps, respectively. The choice of linear versus log and frequency ranges are determined for the particular application. The linear and log chirp signals are defined as follows:

$$\text{chirp}_{linear}(r) = \sin\left(2\pi\left(r \cdot f\text{min} + \frac{r^2 \cdot (f_{max} - f_{min})}{2L}\right)\right); \quad (1)$$

and $$\text{chirp}_{log}(r) = \sin\left(2\pi\left(\frac{f_{min} \cdot L}{\ln\left(\frac{f_{max}}{f_{min}}\right)}\right)\left(\left(\frac{f_{max}}{f_{min}}\right)^{(r/l)} - 1\right)\right), \quad (2)$$

where r=M/2 is the distance in units of pixels (eventually to become a radius, r), $f_{min}$ is the minimum frequency of the chirp, $f_{max}$ is the maximum frequency of the chirp, and L is the total length of the chirp in the units of pixels. A graph of a linear chirp is shown in FIG. 4 where r=256 pixels, $F_{min}$=0.0125 cycles/pixel, $F_{max}$=0.333 cycles/pixel, M=512. A log chirp is shown in FIG. 5 where Fmin=0.0125, and Fmax=0.400. It is also possible to quantize the chirps into a binary representation consisting of a square wave that changes in frequency as shown in FIG. 6. An entirely different type of carrier is a noise signal whose bandwidth is restricted to higher frequencies for minimum human visibility. Optionally, a tapered weighting function may be used to modify these 1-D carrier signals.

The next step 44 is to convert the 1-D carrier signal into a 2-D image. The preferred method is to rotationally sweep the 1-D signal about the center of the image (M/2, M/2) thus creating an encoding carrier image that is rotationally symmetric about its center. This is done to enable the decoder to extract the data image regardless of the rotational position of the image when presented to the decoder. Other options for converting from a 1-D signal to a 2-D image include sweeping the 1-D carrier signal through a limited range (e.g. 180°). An optional step 46 is to perform a spatial shift in a periodic fashion in order to remove any positional bias in the decoder. For a signal swept about the image center, a spatial shift of x=−M/2 and y=−M/2 will reposition the 2-D Carrier to the image origin (x=0,y=0). This is useful if the decoder does not have the ability to find a start code in the 2-D data array and one chooses to work in a very explicitly defined closed system. The result of these steps is a M×M encoding carrier image 48.

Figure 7:
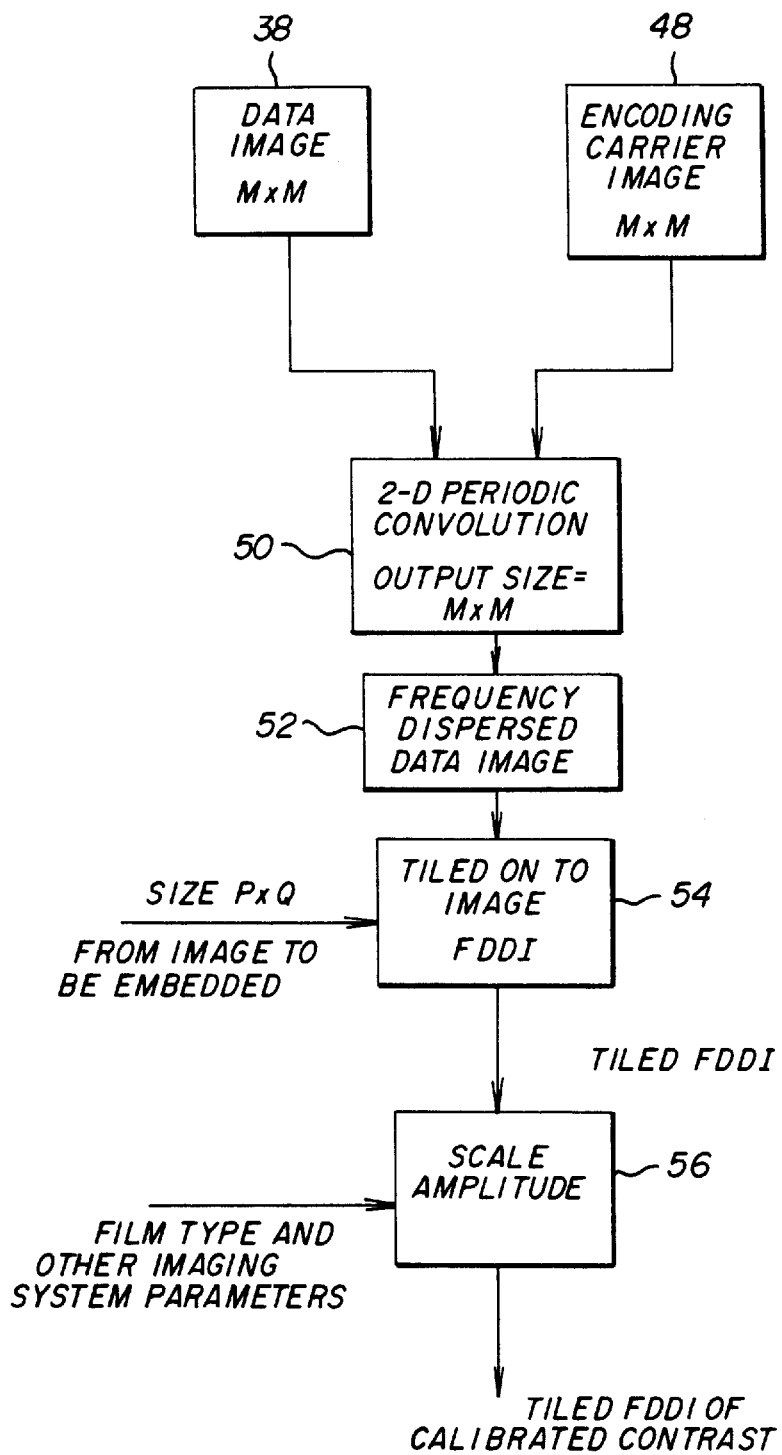
FIG. 7 is a flow chart showing the steps for convolving the data image and the encoding carrier image.

Referring to FIG. 7, the process of convolving the encoding carrier image with the data image will be described in more detail. The data image 38 and the encoding carrier image 48 are convolved 50 to create an M×M frequency dispersed data image 52. The convolution process is well known to those skilled in the art. It is preferably accomplished by taking a 2-D Discrete Fourier Transform (DFT) of both the encoding carrier image and the data image, multiplying the transforms together, and taking the inverse DFT of the product. The convolution may also be accomplished by direct spatial convolution. The resulting M×M frequency dispersed data image from the convolution is tiled 54 onto the source image. If the source image is not covered by an integer number of M×M tiles (generally the case), fractional portions of an M×M tile are used at the edges. In the case where the source image is smaller than the M×M frequency dispersed data image the reliability of error free recovery of the data is diminished. This may still be useful in applications where the mere presence of a message is important, such as in copyright notification.

The final step 56 in this process is to scale the amplitude of the tiled frequency dispersed data image so that when added to the source image it is unnoticeable to the average human viewer. The scaling value depends on a number of parameters of the image such as baseline noise level and displayed dynamic range. We have determined the scaling values for 8-bit images on a series of film types, having quantified their inherent noise level, or grain (see Table 1).

TABLE 1

| Film Type | Estimated Scaling Value |
| --- | --- |
| Kodachrome 25 | 6 |
| Kodachrome 64 | 8 |
| Ektachrome 100 | 10 |
| Ektachrome 200 | 16 |

At this point the source image and the tiled frequency dispersed data image are added 14 (see FIG. 1) to produce the source image with embedded data. This addition can be done in a number of ways by either digital or analog processes. In the digital process, the digital versions of the images are the same size and are simply added together pixel by pixel. In areas where the sum is less than the minimum or greater than the maximum allowable code value, the sum is clipped.

There are many applications where it is convenient to add the images by analog methods such as in a photographic film or paper manufacturing process, in an optical photographic printer or in a camera. In this case, the resulting addition may not be a true addition, but rather an addition subject to the nonlinearity of the film or paper's tone scale curve. This addition essentially becomes an addition in the density domain (a log of the actual luminances) with some deviation at the toe and shoulders of the film or paper. Fortunately, these deviations only cause a slight reduction in the subsequent performance of the decoding step. In the optical addition case, a mask is made of the tiled frequency dispersed data image or a device is made to expose the tiled frequency dispersed data image onto the film or photographic paper. In either case, Table 2 lists the points in the optical pathway where the optical addition may be performed.

TABLE 2

1. on the unexposed roll of film during or after the manufacturing steps;
2. in the film plane of the camera;
3. in the negative (or positive) gate of the enlarger or printer making prints from the film;
4. as a contact print exposure either before or after the prints exposure to the image;
5. as a simultaneous (or nearly simultaneous) exposure using a beam splitter in the machine printer;
6. by pre-exposing the paper or film either during or after the manufacturing steps; or
7. by including an additional layer containing the frequency dispersed data image that exposes the paper or film along with the source image exposure, the extra layer is washed away in the paper or film's processing.

Figure 8:
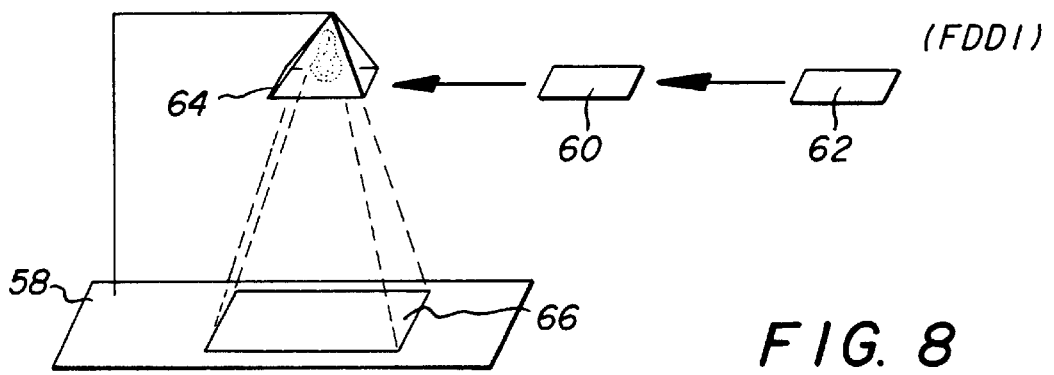
FIG. 8 is a schematic diagram illustrating one method of adding the frequency dispersed data image to the source image.
Figure 9:
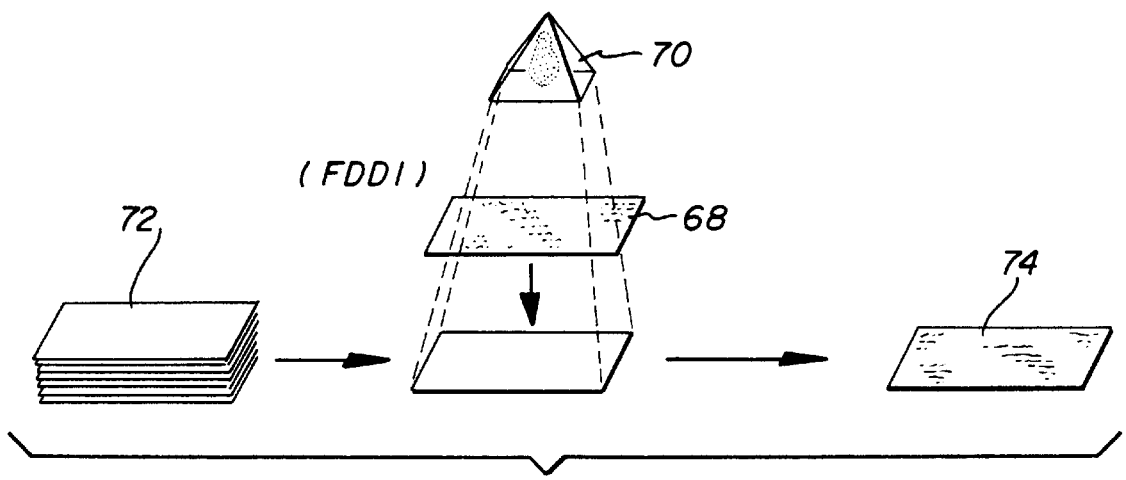
FIG. 9 is a schematic diagram illustrating an alternative method of adding the frequency dispersed data image to the source image.
Figure 10:
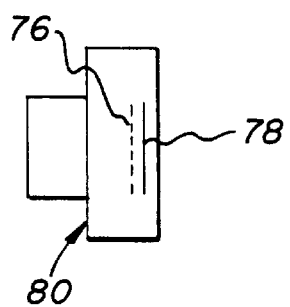
FIG. 10 is a schematic diagram illustrating a further alternative method of adding the frequency dispersed data image to the source image.

FIG. 8 is a schematic diagram showing a photographic printer 58 wherein a photographic transparency 60 bearing the source image and a transparency 62 bearing a tiled frequency dispersed data image are mounted in the printing gate 64 of the photographic printer 58. The images are optically added by superimposing them in the printing gate and simultaneously exposing them onto photographic paper 66. FIG. 9 is a schematic diagram illustrating a method of pre-exposing photographic paper with the tiled frequency dispersed data image. A transparency 68 bearing the tiled frequency dispersed data image is exposed by a light source 70 onto unexposed photographic paper 72 in the paper manufacturing process for producing photographic paper 74 with embedded data message according to the present invention. Referring to FIG. 10, a schematic diagram shows a reticle 76 bearing the tiled frequency dispersed data image in the film plane 78 of a camera 80, for exposing the tiled frequency dispersed data image onto the film simultaneously with the photographic exposure. Alternatively, the adding step may be performed by affixing a transparency bearing the frequency dispersed data image onto the source image.

FIG. 11 shows the steps involved in converting a hardcopy version of a source image having embedded data to a digital version of the image. First, the image is scanned 82 to produce a digital representation by standard means such as a flatbed scanner.

A calibration 84 may be performed to calculate a pixel array R×R in the scanned image that is the same size in the scanned image that is occupied by the M×M frequency dispersed data image. R may be different from M due to differing pixel spacings between the input scanner and the output scanner used to create the frequency dispersed data image, due to optical magnification in the optical path, or due to digital size adjustment in the steps between the encoder and decoder. This step employs the size M, the output pixel spacing ($dpi_{out}$) of the device used to generate the frequency dispersed data image, the optical magnification of the printer employed to produce the hardcopy image (Mag), and the image scanner pixel spacing ($dpi_{in}$) employed in step 82. R is calculated as follows:

$$R = (M/dpi_{out})(Mag)(dpi_{in}) \qquad (3)$$

There are also several optional image processing steps following the scanning step 82. These include a conversion of a 3-color image to a luminance image 86, by using only one of the color records R, G, or B, or any other technique that uses a weighted average of R, G, and B. Another optional step is to enhance the high frequency component of the image 88 by either applying a high pass-filter or an unsharp mask to the image.

A third optional step is to examine 90 the high frequency enhanced image to find the R×R pixel array with the lowest standard deviation within a specified mean gray-level range. The goal of these steps is to find an R×R pixel array in the image where the performance of the decoder will be optimized. An alternative to this third optional step is to sum the absolute values of the difference between the pixels and the local mean in a candidate R×R window of the high frequency enhanced image. This approach suffers lower performance but gains computational efficiency. These optional steps are intended to prevent a section of the image being selected that may be located in an area in the shadows of the image where the tone scale has reduced the contrast of the embedded frequency dispersed data image, or in the highlights where a similar contrast reduction occurs. Once this area is selected, the R×R pixel array is extracted 92 from the original unfiltered version of the scanned image.

If the optional steps outlined above are omitted, any R×R pixel array may be selected from the image. The center of the image may be used as the default. Finally, the R×R pixel array that has been extracted from the image is resized 94 into an M×M pixel array 96 using conventional methods capable of non-integer resizing, such as bilinear interpolation or cubic spline interpolation.

If the image having embedded data was an unmodified digital image, R=M and therefore the steps 82, 84, and 94 would be omitted. The remaining steps would be performed with R=M.

FIG. 12 shows the cross-correlation step 16 (see FIG. 1) in further detail. The M×M pixel array 96 and the M×M Carrier Image 98 are cross-correlated 100. The cross correlation is accomplished using well known digital image processing techniques. Analogous to the convolution step, the result of the cross-correlation is an M×M pixel array. The M×M pixel array resulting from the cross correlation, referred to as the recovered data image, is then normalized 102 to a desired range, such as a 0–255 range for an 8-bit image. The recovered data image may be spatially shifted, rotated, or contain echoes of the original data image.

Figure 13:
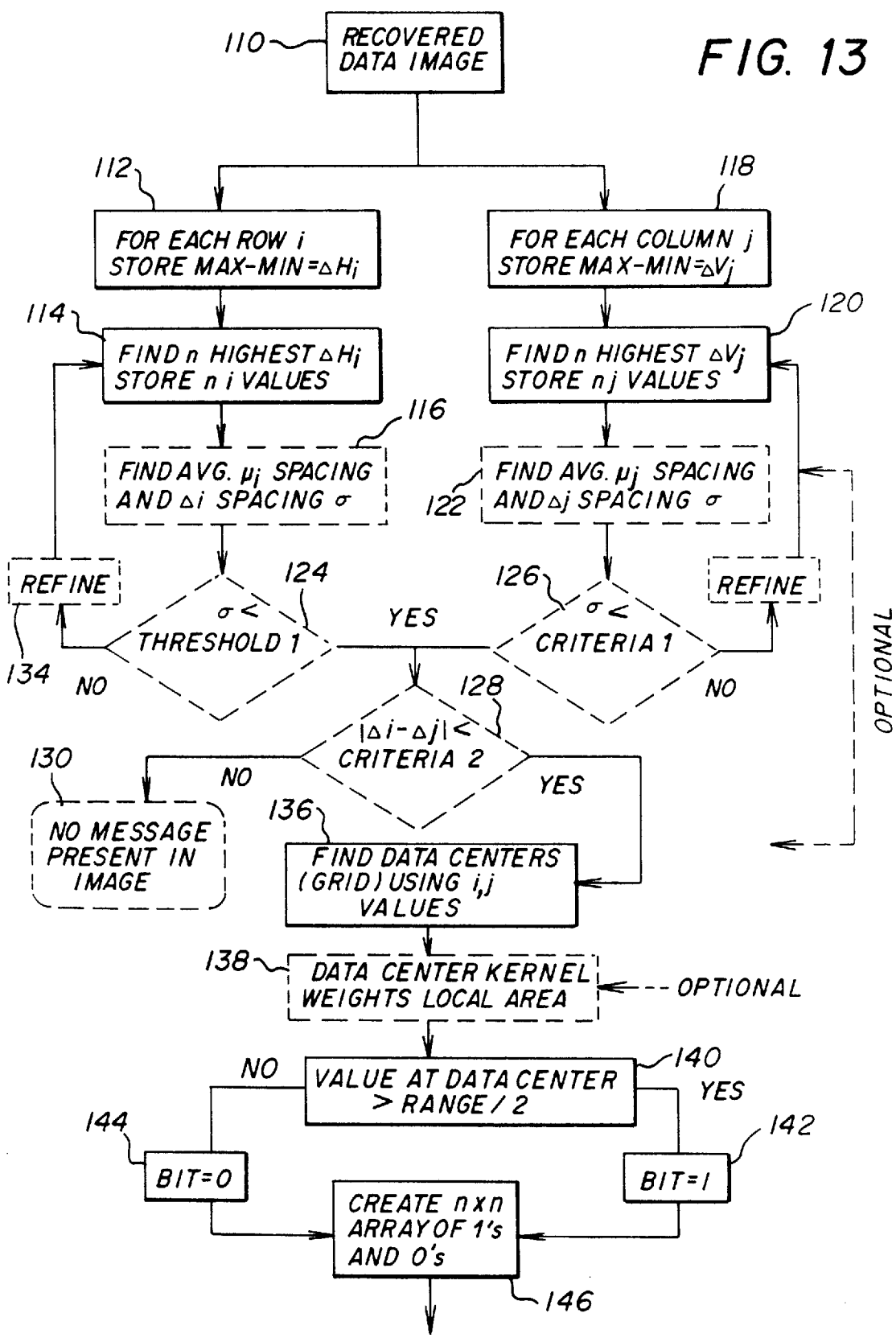
FIG. 13 is a flow chart illustrating one method for extracting digital data from a recovered data image.

FIG. 13 shows an "extreme value" method of extracting the 2-D data array from the recovered data image 110. For each row i of the M×M pixel array, the maximum and minimum pixel values are found, and their difference $\Delta H_i$ is taken 112, referred to as the horizontal range. The n highest $\Delta H_i$ values are found and their i indices are stored 114. The integer n, as previously defined, is the number of data centers in a row of data centers. For each column j in the array, the maximum and minimum pixel values are found and their difference $\Delta V_j$ is taken 118, referred to as the vertical range. The n highest values $\Delta V_j$ are found and their indices j are stored 120.

The next steps are optional and are intended to improve the performance when the recovered data image contains strong echoes of the data image and/or the data centers are of low amplitude. The first of these optional steps 116 and 122 are to determine the average spacing $\mu i$ and the standard deviation $\sigma i$ of the n indices i that were stored in the previous step, where:

$$\mu i = \frac{i_n - i_1}{n - 1}, \qquad (4)$$

$$\sigma i = \sqrt{\frac{\sum_{k=1}^{n-1}(i_{k+1} - i_k)^2}{n - 1}} \qquad (5)$$

The standard deviation $\sigma i$ is compared with a first threshold value 124. If it is less than the threshold value, the selected values of i are uniformly spaced, and it is likely that they will represent the rows on which data centers are located. If however, the $\sigma i$ value exceeds the threshold, this means that the lines are not evenly spaced and therefore at least one or more of the indices do not represent the location of a row of data centers. In that case, a refining step 134 is needed. The value $i_k$ that contributes most to the high value of $\sigma i$ is identified. The process returns to step 114 and selects another n highest values of $\Delta H_i$, with $\Delta H_{i_k}$ excluded from selection. This process is repeated until $\sigma i$ is lower than the threshold.

The same procedure is applied to the columns of the image as shown in steps 122 and 126. When the process is complete for rows and columns, the average spacings are compared in step 128. If the absolute value of ($\mu i - \mu j$) is less than a second threshold value, the selected values of i and j are uniformly spaced, and it is likely that they will represent the rows and columns on which data centers are located, and the procedure moves to step 136. If not, the conclusion is reached 130 that there is no embedded message in the image. If these optional steps are omitted, then the procedure directly advances to step 136 from steps 114 and 120.

At this point the data center locations are determined from the n×n intersections of the n selected values of both i and j, in step 136. The next step is to determine the cross-correlation values located at or around these data centers. An optional step 138 is to filter or weight the local neighborhood of pixels at the data center by a sharpening kernel to enhance the cross-correlation value at the data center. The center of the range of all the cross-correlation values in the recovered data image is determined. The cross-correlation values at the data centers are then compared 140 to the center of the range (i.e., 127.5 for a 0–255 range). If the cross-correlation value at the data center is greater than center of the range, the bit located at the data center is assigned to be 1, and if less, the bit is assigned 0 in steps 142 and 144, respectively. These bits are then loaded into an extracted n×n array 146 in direct correspondence to their location in the recovered data image.

Figure 14:
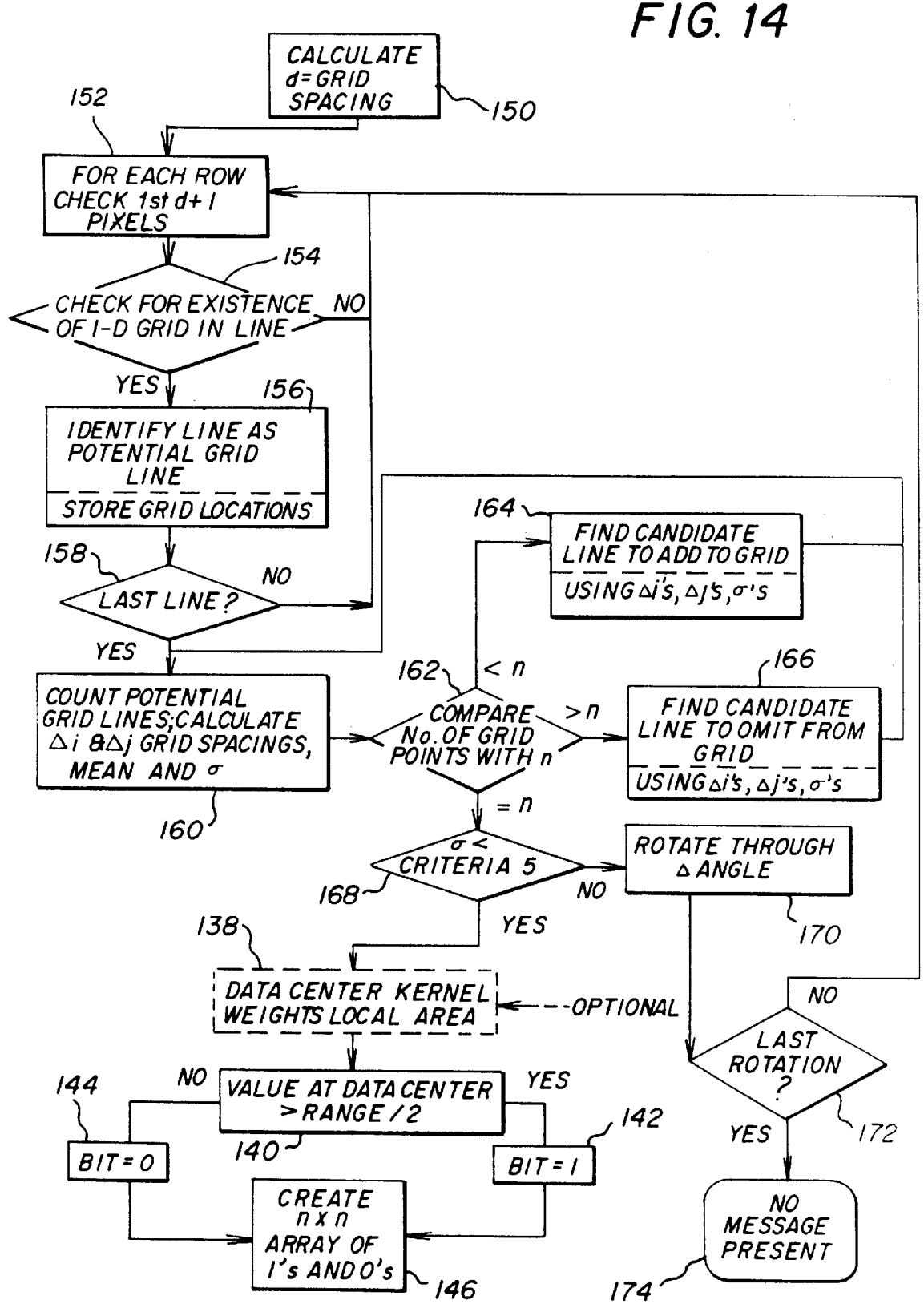
FIG. 14 is a flow chart illustrating an alternate method for extracting digital data from a recovered data image.
Figure 15:
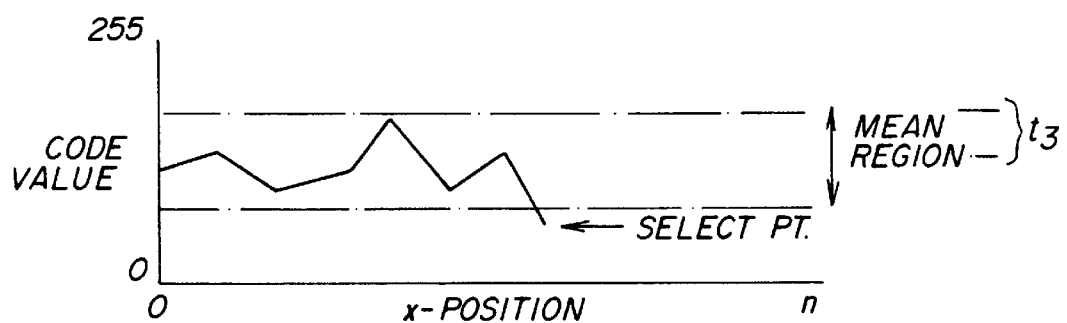
FIG. 15 is a graph useful in describing the step for detecting the digital data in a data image.
Figure 16:
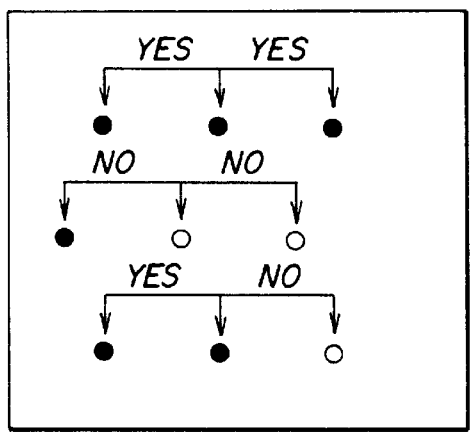
FIGS. 16–21 are a schematic diagrams useful in describing the step for detecting the digital data in a data image.

FIG. 14 shows an alternate pattern matching method for extracting the n×n data array from the recovered data image 110 while accounting for possible rotation between the original and final images. First an array spacing d is calculated as d=M/n 150. Each row of the recovered data image is processed as follows. The first d+1 pixels are examined 152, and if for any of these pixels, the absolute value of the pixel minus the center of the range cross-correlation values is greater than a predetermined threshold $t_3$ (see FIG. 15), the pixel is considered a possible first identified data center in an n×n array. In which case, the other (n−1) pixels in the line at a distance of integer multiples of d away from the first identified pixel (the one identified in step 152) are examined. If at least n−2 of these pixels meet the same criterion 154 for selecting the first pixel in the line, then declare this line a potential data line and save its y-position and the x-position of the first pixel on the line 156. As shown in the example in FIG. 16, assuming n=3, data center pixels are shown as filled circles and non-data center pixels are shown as open circles. On the first line all three potential data centers exceed the threshold, so the line is declared a potential data line. Only one point matches in the second line because the starting point chosen was not in fact a data point. The test is repeated using the next pixel that falls outside the threshold. In the third line, two of the three pixels matched, so this line is also declared a potential data line. Allowing a match even when fewer than n pixels have been identified in a line improves performance in the presence of noise. The previous steps are repeated 158 until the entire recovered data image has been processed.

Figure 17:
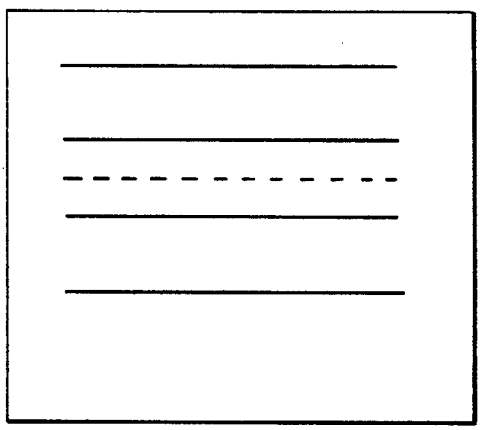

Depending on the signal-to-noise ratio of the image, this procedure will yield a varying number of potential data lines. This information is employed to compute 160 the vertical spacings between potential data lines $\Delta i$, the horizontal spacings between potential data centers $\Delta j$, the mean of the vertical spacings $\mu i$, the mean of the horizontal spacings $\mu j$, the standard deviation for the vertical spacings $\sigma i$, and the standard deviation for the horizontal spacings $\sigma j$. If more than n potential data lines have been identified in step 162, some of them must have been classified incorrectly. In this case, each line is tested 166 to see if there is another potential data line some multiple of d lines away, either above or below in the recovered data image. For example, each of the lines in FIG. 17 is the same distance from each other line except for the dashed line. Since the dashed line has no neighbors a multiple of d lines away, it is deleted. If more than n data lines still remain step 166 is repeated. Next, the starting pixel positions on each line are compared. Any line with a starting pixel that does not match the starting pixel of at least one other line is discarded (this is similar to the process in step 166, but with a stronger constraint).

Figure 18:
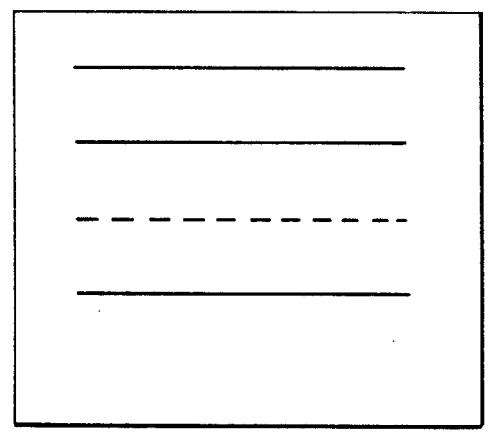

If fewer than n data lines remain after step 160, one or more data lines were not found using the matching process of steps 152 and 154. When this condition occurs, additional data lines are assumed to exist at distance d from one of the identified data lines and are added to the set of data lines 164. For example, as shown in FIG. 18, assuming n=4, only the first, second, and fourth data lines were located by horizontal matching. Since one line is known to be missing, it is added in (dotted line) between lines 2 and 4. If exactly n data lines remain in step 162, then the standard deviations $\sigma i$ and $\sigma j$ are compared to a predetermined threshold $t_4$ to ensure that the spacings of the data centers are uniform. When the data centers have been thus identified, the data is extracted from the recovered data image as described previously. That is, the known line positions, starting x-positions, and grid spacing are used to index into the original image and retrieve the code values of the data pixels at those locations 138–146. The pattern matching approach has the advantage over the extreme value method in that it is usable in lower signal-to-noise ratio images and is somewhat angle-invariant, but has the disadvantage of being slower.

If either of the standard deviations $\sigma i$ or $\sigma j$ are above the threshold $t_4$, the recovered data image is rotated 170 through a small angle and the pattern matching process is repeated. If, after searching through a range of angles 172 (e.g. 0–45 deg.), no standard deviations pass the threshold test of step 168, the process ends up at step 174, which is the conclusion that no data message is present. In copyright applications, this may indicate that a notice of copyright has not been embedded in the image using the method of the present invention.

Figure 19:
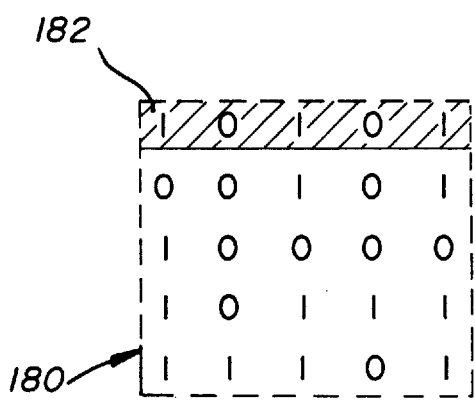
Figure 20:
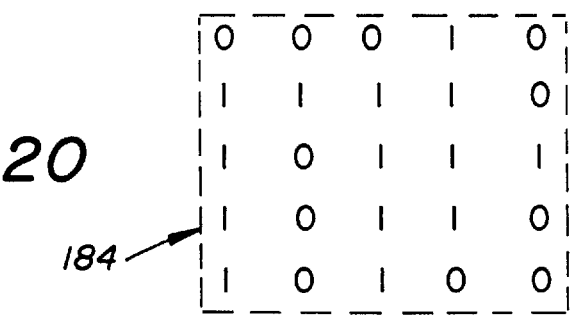
Figure 21:
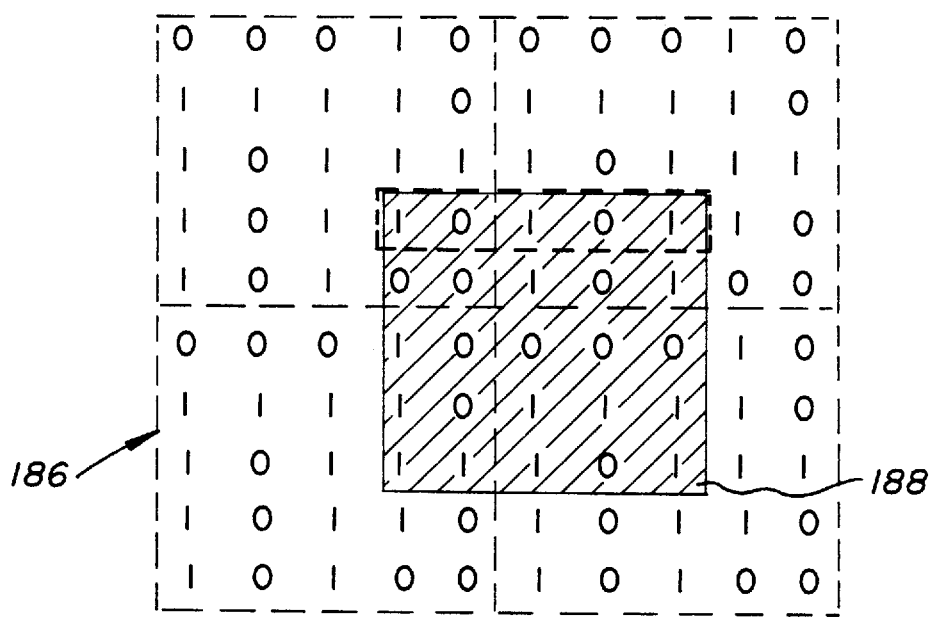

The final step, as shown in FIGS. 19–21, is to convert the extracted n×n decoded 2-D data array 184 of bits into the $n^2$ data string. Although the method of the present invention requires that the recovered data image be of the same size as the tiles (i.e. M×M) of the embedded frequency dispersed data images, it does not require that their boundaries match. Therefore, the extracted n×n array of data will most likely be spatially offset in a periodic fashion and possibly rotated through an integer multiple of 90 degrees. To recover the encoded 2-D data array 180, the decoded 2-D data array 184 is tiled as shown in FIG. 22 to produce a 2-D tiled data array 186. A 2-D tiled data array 186 is searched for the unique start code sequence 182 through integer multiples of 90 degrees. Once the start code is found the rest of the 2-D n×n data array 188 is extracted, which contains the same bit pattern as the encoded data array 180. The start code is used to correctly orient the data of the data array.

If the hardcopy image was a transparency, it may be necessary to flip the data array about one of its axis and repeat the search with four angles. If the particular application could result in tone scale inversions, then it will be necessary to invert all the bits and repeat the search for the start code.

The invention has been described with reference to a preferred embodiment. However, it will be appreciated that variations and modifications can be effected by a person of ordinary skill in the art without departing from the scope of the invention.

| PARTS LIST |
| --- |
| 10 generate multi-level data image step |
| 12 convolve data image with encoding carrier image step |
| 14 add frequency dispersed data image to source image step |
| 16 cross correlate step |
| 18 extract data step |
| 20 1-D data message string |
| 22 add identification code step |
| 24 add error correction bits step |

13
-continued

PARTS LIST

- 26 measure total length of string step
- 28 calculate integer n step
- 30 reordering step
- 32 convert bits to multi-level form step
- 34 resize step
- 36 convolve with data center kernel step
- 38 data image
- 40 select carrier image size step
- 42 generate 1-D carrier signal step
- 44 convert 1-D carrier signal to 2-D encoding carrier image step
- 46 perform spatial shift step
- 48 encoding carrier image
- 50 convolve step
- 52 frequency dispersed data image
- 54 tiling step
- 56 scaling step
- 58 photographic printer
- 60 photographic transparency bearing source image
- 62 photographic transparency bearing frequency dispersed data image
- 64 printing gate
- 66 exposed photographic paper
- 68 contact transparency with frequency dispersed data image
- 70 light source
- 72 unexposed photographic paper
- 74 photographic paper with embedded data
- 76 reticle
- 78 film plane
- 80 camera
- 82 scanning step
- 84 spatial calibration step
- 86 RGB to luminance conversion step
- 88 high pass filter step
- 90 find best R × R pixel area step
- 92 extract R × R area step
- 94 resize R × R image area step
- 96 M × M subsection of image
- 98 M × M carrier image
- 100 cross correlation step
- 102 normalization step
- 110 recovered data image
- 112 store horizontal difference step
- 114 store horizontal indices step
- 116 find average horizontal spacing step
- 118 store vertical difference step
- 120 store vertical indices step
- 122 find average vertical spacing step
- 124 horizontal compare step
- 126 vertical compare step
- 128 compare average spacing step
- 130 conclusion of no message step
- 136 find data center step
- 138 weigh local area step
- 140 determine value step
- 142 bit = 1 step
- 144 bit = 0 step
- 146 create array step
- 150 calculate grid spacing step
- 152 examine first d + 1 pixel step
- 154 check for grid step
- 156 save grid locations step
- 158 repeat step
- 160 compute spacing statistics step
- 162 compare number of grid points step
- 164 find candidate line to add step
- 166 find candidate line to omit step
- 168 threshold test step
- 170 rotate step
- 172 last rotation step
- 174 no message present step
- 180 encoded 2-D data array
- 182 unique start code sequence
- 184 decoded 2-D data array
- 186 tiled 2-D data array
- 188 2-D message within tiled data array

14

We claim:

1. A method of embedding digital data in a source image, comprising the steps of:
   a) generating a multi-level data image representing the digital data;
   b) convolving the multi-level data image with a variable frequency encoding carrier image to produce a frequency dispersed data image; wherein the variable frequency encoding carrier image is generated by the steps of:
      b1) providing a 1-dimensional variable frequency carrier signal, wherein the 1-dimensional variable frequency carrier signal is a linear chip signal defined by:

$$\text{chirp}_{linear}(r) = \sin\left(2\pi\left(r \cdot f\min + \frac{r^2 \cdot (f_{max} - f_{min})}{2L}\right)\right),$$

where r is the distance in units of pixels, $f_{min}$ is the minimum frequency of the chirp, $f_{max}$ is the maximum frequency of the chirp, and L is the total length of the chirp in the units of pixels; and
      b2) converting the 1-dimensional variable frequency carrier signal to a 2-dimensional variable frequency carrier signal using a rotational sweep; and
   c) adding the frequency dispersed data image to the source image to produce a source image containing embedded data.

2. A method of embedding digital data in a source image, comprising the steps of:
   a) generating a multi-level data image representing the digital data;
   b) convolving the multi-level data image with a variable frequency encoding carrier image to produce a frequency dispersed data image; wherein the variable frequency encoding carrier image is generated by the steps of:
      b1) providing a 1-dimensional variable frequency carrier signal, wherein the 1-dimensional variable frequency carrier signal is a logarithmic chirp signal defined by:

$$\text{chirp}_{log}(r) = \sin\left(2\pi\left(\frac{f_{min} \cdot L}{\ln\left(\frac{f_{max}}{f_{min}}\right)}\right)\left(\left(\frac{f_{max}}{f_{min}}\right)^{(r/L)} - 1\right)\right),$$

where r is the distance in units of pixels, $f_{min}$ is the minimum frequency of the chirp, $f_{max}$ is the maximum frequency of the chirp, and L is the total length of the chirp in the units of pixels;
      b2) converting the 1-dimensional variable frequency carrier signal to a 2-dimensional variable frequency carrier signal using a rotational sweep; and
   c) adding the frequency dispersed data image to the source image to produce a source image containing embedded data.

3. A method of embedding digital data in a source image, comprising the steps of:
   a) generating a multi-level data image representing the digital data;
   b) convolving the multi-level data image with a variable frequency encoding carrier image to produce a frequency dispersed data image;
   c) adding the frequency dispersed data image to the source image to produce a source image containing embedded data;

d) cross correlating the source image containing embedded data with a variable frequency decoding carrier image to recover the data image;

e) extracting the digital data from the recovered data image; and f) locating a subset of the source image containing embedded data having the lowest high-frequency component variance and cross correlating the subset with the decoding carrier image.

4. A method of embedding digital data in a source image, comprising the steps of:

a) generating a multi-level data image representing the digital data;

b) convolving the multi-level data image with a variable frequency encoding carrier image to produce a frequency dispersed data image; and c) adding the frequency dispersed data image to the source image to produce a source image containing embedded data, wherein the step of adding is performed by optical techniques, and wherein the variable frequency dispersed data image is added to the source image in a photographic printer by placing a transparency having the frequency dispersed image in the film gate of the printer.

5. A method of embedding digital data in a source image, comprising the steps of:

a) generating a multi-level data image representing the digital data;

b) convolving the multi-level data image with a variable frequency encoding carrier image to produce a frequency dispersed data image; and c) adding the frequency dispersed data image to the source image to produce a source image containing embedded data, wherein the step of adding is performed by optical techniques, and wherein the frequency dispersed data image is added to the source image in a photographic printer by pre-exposing photographic paper used in the printer with the frequency dispersed image.

6. A method of embedding digital data in a source image, comprising the steps of:

a) generating a multi-level data image representing the digital data;

b) convolving the multi-level data image with a variable frequency encoding carrier image to produce a frequency dispersed data image; and c) adding the frequency dispersed data image to the source image to produce a source image containing embedded data, wherein the variable frequency encoding carrier image is generated by the steps of:

b1) providing a 1-dimensional variable frequency carrier signal; and b2) converting the 1-dimensional variable frequency carrier signal to a 2-dimensional variable frequency carrier signal using a rotational sweep; and c) applying a tapered weighting function to the variable frequency carrier signal.

7. A method of embedding digital data in a source image, comprising the steps of:

a) generating a multi-level data image representing the digital data;

b) convolving the multi-level data image with a variable frequency encoding carrier image to produce a frequency dispersed data image; and c) adding the frequency dispersed data image to the source image to produce a source image containing embedded data, wherein the adding step is performed optically, and wherein the step of adding the frequency dispersed data image to the source image utilizes a scaling factor dependent on film characteristics.

8. A method of embedding digital data in a source image, comprising the steps of:

a) generating a multi-level data image representing the digital data;

b) convolving the multi-level data image with a variable frequency encoding carrier image to produce a frequency dispersed data image; and c) adding the frequency dispersed data image to the source image to produce a source image containing embedded data, wherein the adding step is performed optically, and wherein the adding step is performed by contact exposing a transparency bearing the frequency dispersed data image onto photographic paper.

9. A method of embedding digital data in a source image, comprising the steps of:

a) generating a multi-level data image representing the digital data;

b) convolving the multi-level data image with a variable frequency encoding carrier image to produce a frequency dispersed data image; and c) adding the frequency dispersed data image to the source image to produce a source image containing embedded data, wherein the adding step is performed optically, and wherein the adding step is performed by simultaneously exposing the source image and the frequency dispersed data image onto photographic paper in photographic printer.

10. A method of embedding digital data in a source image, comprising the steps of:

a) generating a multi-level data image representing the digital data;

b) convolving the multi-level data image with a variable frequency encoding carrier image to produce a frequency dispersed data image; and c) adding the frequency dispersed data image to the source image to produce a source image containing embedded data, wherein the adding step is performed optically, and wherein the adding step is performed by affixing a transparency bearing the frequency dispersed data image onto the source image.

11. A method of embedding digital data in a source image, comprising the steps of:

a) generating a multi-level data image representing the digital data;

b) convolving the multi-level data image with a variable frequency encoding carrier image to produce a frequency dispersed data image; and c) adding the frequency dispersed data image to the source image to produce a source image containing embedded data;

d) cross correlating the source image containing embedded data with a variable frequency decoding carrier image to recover the data image; and e) extracting the digital image from the recovered data image; wherein the recovered data image has rows and columns of values, further comprising the steps of:

e1) finding the difference between the minimum and maximum values for each row of the recovered data image to produce row difference values;

e2) finding the difference between the minimum and maximum values for each column of the recovered data image to produce column difference values;

e3) finding the n highest difference values for the rows and saving the indices of these rows, where n is determined from the size of the multi-level data message;

e4) finding the n highest difference values for the columns and saving the indices of these columns, where n is determined from the size of the multi-level data message; and e5) locating data centers in the recovered data image by intersecting the saved rows and columns.

* * * * *